United States Patent
Tarsi et al.

(10) Patent No.: US 9,971,809 B1
(45) Date of Patent: May 15, 2018

(54) SYSTEMS AND METHODS FOR SEARCHING UNSTRUCTURED DOCUMENTS FOR STRUCTURED DATA

(71) Applicant: Symantec Corporation, Mountain View, CA (US)

(72) Inventors: Yuval Tarsi, Lafayette, CA (US); Dan Boeriu, Walnut Creek, CA (US)

(73) Assignee: Symantec Corporation, Mountain View, CA (US)

( * ) Notice: Subject to any disclaimer, the term of this patent is extended or adjusted under 35 U.S.C. 154(b) by 470 days.

(21) Appl. No.: 14/868,334

(22) Filed: Sep. 28, 2015

(51) Int. Cl.
*G06F 17/30* (2006.01)

(52) U.S. Cl.
CPC .. *G06F 17/30477* (2013.01); *G06F 17/30631* (2013.01); *G06F 17/30657* (2013.01)

(58) Field of Classification Search
CPC ......... G06F 17/30477; G06F 17/30657; G06F 17/30631
See application file for complete search history.

(56) References Cited

U.S. PATENT DOCUMENTS

| | | | |
|---|---|---|---|
| 8,688,601 B2 | 4/2014 | Jaiswal | |
| 2006/0053169 A1* | 3/2006 | Straub | G06F 17/30864 |
| 2014/0122455 A1* | 5/2014 | Leitner | G06F 17/30864 707/706 |
| 2016/0253521 A1* | 9/2016 | Esmailzadeh | G06F 21/6245 726/4 |

OTHER PUBLICATIONS

Xiaole Zhu, et al.; Systems and Methods for Determining Whether Transmission of Sensitive Data Is Expected; U.S. Appl. No. 14/283,824, filed May 21, 2014.
Michael Hart, et al.; Systems and Methods for Tokenizing User-Annotated Names; U.S. Appl. No. 14/525,864, filed Oct. 28, 2014.
Alok Dwivedi, et al.; Systems and Methods for Automatically Translating Data Records; U.S. Appl. No. 14/540,171, filed Nov. 13, 2014.

* cited by examiner

*Primary Examiner* — Mahesh H Dwivedi
(74) *Attorney, Agent, or Firm* — FisherBroyles, LLP

(57) ABSTRACT

The disclosed computer-implemented method for searching unstructured documents for structured data may include (1) receiving a request to search unstructured documents for a document that contains data (e.g., sensitive data) from a structured dataset, (2) generating a secure search index (e.g., a Bloom filter) for searching the unstructured documents for the sensitive data, (3) extracting a first token and a second token from an unstructured document, (4) generating a hashed key from the first token and the second token, (5) querying the secure search index to determine whether the second hashed key is contained in the secure search index, and (6) responding, upon determining that the second hashed key is contained in the secure search index, to the request with information about the unstructured document. Various other methods, systems, and computer-readable media are also disclosed.

20 Claims, 10 Drawing Sheets

| | Social Security Number | Account Number | First Name | Last Name | City | ZIP Code |
|---|---|---|---|---|---|---|
| Record 414 | 123-45-6789 | a-987654321 | John | Smith | Smallville | 90210 |
| Record 416 | 111-11-1111 | b-222222222 | Jane | Adams | Bigville | 02345 |
| Record 418 | 333-33-3333 | c-333333333 | Jane | Baker | Midville | 63011 |

FIG. 4

SYSTEMS AND METHODS FOR SEARCHING UNSTRUCTURED DOCUMENTS FOR STRUCTURED DATA

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, and portable storage devices may pose unique challenges for individuals and organizations concerned with preventing the loss and/or exposure of sensitive data. Individuals and organizations are therefore increasingly looking to data loss prevention ("DLP") solutions to protect their sensitive data.

In order to identify sensitive structured data in unstructured text, typical DLP solutions may maintain an index of the sensitive structured data and search the index for tokens that appear in the unstructured text. In order to maintain the security of the sensitive structured data, such indexes may contain salted cryptographic hashes of sensitive data rather than the sensitive data itself. Unfortunately, for large structured datasets, the number of values indexed can be in the billions, resulting in an index that may be dozens of gigabytes or more in size. Moreover in order to enable efficient lookup, such indexes may be completely stored in memory, which may limit the environments where such indexes may be deployed to dedicated servers with abundant memory. Furthermore, distributing the indexes beyond tightly controlled server environments may also present security challenges. For example, even though indexed values may be cryptographically hashed, the indexed values may be limited to a relatively small set such that a dictionary attack may be quite feasible. The instant disclosure, therefore, identifies and addresses a need for improved systems and methods for searching unstructured documents for structured data.

SUMMARY

As will be described in greater detail below, the instant disclosure describes various systems and methods for searching unstructured documents for structured data. In one example, a computer-implemented method for searching unstructured documents for structured data may include (1) receiving a request to search unstructured documents for a document that contains (a) a value from a first field of a dataset and (b) a value from a second field of the dataset, (2) generating a secure search index (e.g., a Bloom filter) for searching the unstructured documents by, for each record in the dataset, (a) identifying, within the dataset, the record's value from the first field and the record's value from the second field, (b) generating a first hashed key from the record's value from the first field and the record's value from the second field, and (c) adding the first hashed key to the secure search index, (3) extracting a first token and a second token from an unstructured document, (4) generating a second hashed key from the first token and the second token, (5) querying the secure search index to determine whether the second hashed key is contained in the secure search index, and (6) responding, upon determining that the second hashed key is contained in the secure search index, to the request with information about the unstructured document.

In at least one embodiment, the first field of the dataset may include sensitive data (e.g., social security numbers, account numbers, and/or credit card numbers).

In some embodiments, values from the first field may follow a known pattern, the request for the document may specify that the value from the first field is required to be within a specified distance from the value from the second field, and the step of extracting the first token and the second token from the unstructured document may include (1) using the known pattern to identify the first token within the unstructured document and (2) identifying the second token within the specified distance from the first token.

In some embodiments the step of receiving the request to search unstructured documents for the document may include receiving a request to search unstructured documents for a document that contains (1) the value from the first field of the dataset, (2) the value from the second field of the dataset, and (3) a value from a third field of the dataset. In certain embodiments, values from the first field may follow a known pattern, and values from the second field and values from the third field may not follow a known pattern. In at least one example, the computer-implemented method may further include (1) generating an additional secure search index (e.g., an additional Bloom filter) by, for each record in the dataset, (a) identifying, within the dataset, the record's value from the first field and the record's value from the third field, (b) generating a third hashed key from the record's value from the first field and the record's value from the third field, and (c) adding the third hashed key to the additional secure search index, (2) extracting a third token from the unstructured document, (3), generating a fourth hashed key from the first token and the third token, and (4) querying the additional secure search index to determine whether the fourth hashed key is contained in the additional secure search index. In such embodiments, the step of responding to the request with information about the unstructured document may occur upon determining that the fourth hashed key is contained in the additional secure search index.

In some embodiments, the step of receiving the request to search unstructured documents for the document may include receiving a request to search unstructured documents for a document that contains (a) the value from the first field of the dataset, (b) the value from the second field of the dataset, and (c) a value from a third field of the dataset. In certain embodiments, values from the first field may follow a first known pattern, values from the third field may follow a second known pattern, and values from the second field do not follow a known pattern. In at least one embodiment, the computer-implemented method may further include (1) generating an additional secure search index (e.g., an additional Bloom filter) by, for each record in the dataset, (a) identifying, within the dataset, the record's value from the second field and the record's value from the third field, (b) generating a third hashed key from the record's value from the second field and the record's value from the third field, and (c) adding the third hashed key to the additional secure search index, (2) extracting a third token from the unstructured document, (3) generating a fourth hashed key from the second token and the third token, and (4) querying the additional secure search index to determine whether the fourth hashed key is contained in the additional secure search index. In such embodiments, the step of responding to the request with information about the unstructured document may occur upon determining that the fourth hashed key is contained in the additional secure search index.

In some embodiments, the first hashed key may be generated from the record's value from the first field, the record's value from the second field, and a cryptographic key. In certain embodiments, the second hashed key may be generated from the first token, the second token, and the cryptographic key. In at least one embodiment, the secure search index may be a Bloom filter.

In some embodiments, the step of generating the first hashed key may include (1) generating an intermediate value from a combination of the record's value from the first field and the record's value from the second field and (2) hashing the intermediate value to produce the hashed key. In some embodiments, the step of generating the secure search index for searching the unstructured documents may be performed at a server-side computing device, and the steps of extracting the first token and the second token, generating the second hashed key, and querying the secure search index may be performed at a client-side computing device to which the secure search index has been distributed. In some embodiments, values from the first field may follow a known pattern, and the step of extracting the first token from the unstructured document may include using a regular expression based on the known pattern to identify the first token within the unstructured document.

In one embodiment, a system for implementing the above-described method may include (1) a receiving module, stored in memory, that receives a request to search unstructured documents for a document that contains (a) a value from a first field of a dataset and (b) a value from a second field of the dataset, (2) an index-generating module, stored in memory, that generates a secure search index for searching the unstructured documents by, for each record in the dataset, (a) identifying, within the dataset, the record's value from the first field and the record's value from the second field, (b) generating a first hashed key from the record's value from the first field and the record's value from the second field, and (c) adding the first hashed key to the secure search index, (3) an extracting module, stored in memory, that extracts a first token and a second token from an unstructured document, (4) a key-generating module, stored in memory, that generates a second hashed key from the first token and the second token, (5) a querying module, stored in memory, that queries the secure search index to determine whether the second hashed key is contained in the secure search index, (6) a responding module, stored in memory, that responds, upon determining that the second hashed key is contained in the secure search index, to the request with information about the unstructured document, and (7) at least one physical processor configured to execute the receiving module, the index-generating module, the extracting module, the key-generating module, the querying module, and the responding module. In at least one embodiment, the first field of the dataset may include sensitive data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to search unstructured documents for a document that contains (a) a value from a first field of a dataset and (b) a value from a second field of the dataset, (2) generate a secure search index for searching the unstructured documents by, for each record in the dataset, (a) identifying, within the dataset, the record's value from the first field and the record's value from the second field, (b) generating a first hashed key from the record's value from the first field and the record's value from the second field, and (c) adding the first hashed key to the secure search index, (3) extract a first token and a second token from an unstructured document, (4) generate a second hashed key from the first token and the second token, (5) query the secure search index to determine whether the second hashed key is contained in the secure search index, and (6) respond, upon determining that the second hashed key is contained in the secure search index, to the request with information about the unstructured document. In at least one embodiment, the first field of the dataset may include sensitive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary structured dataset containing sensitive data.

Figure 1:
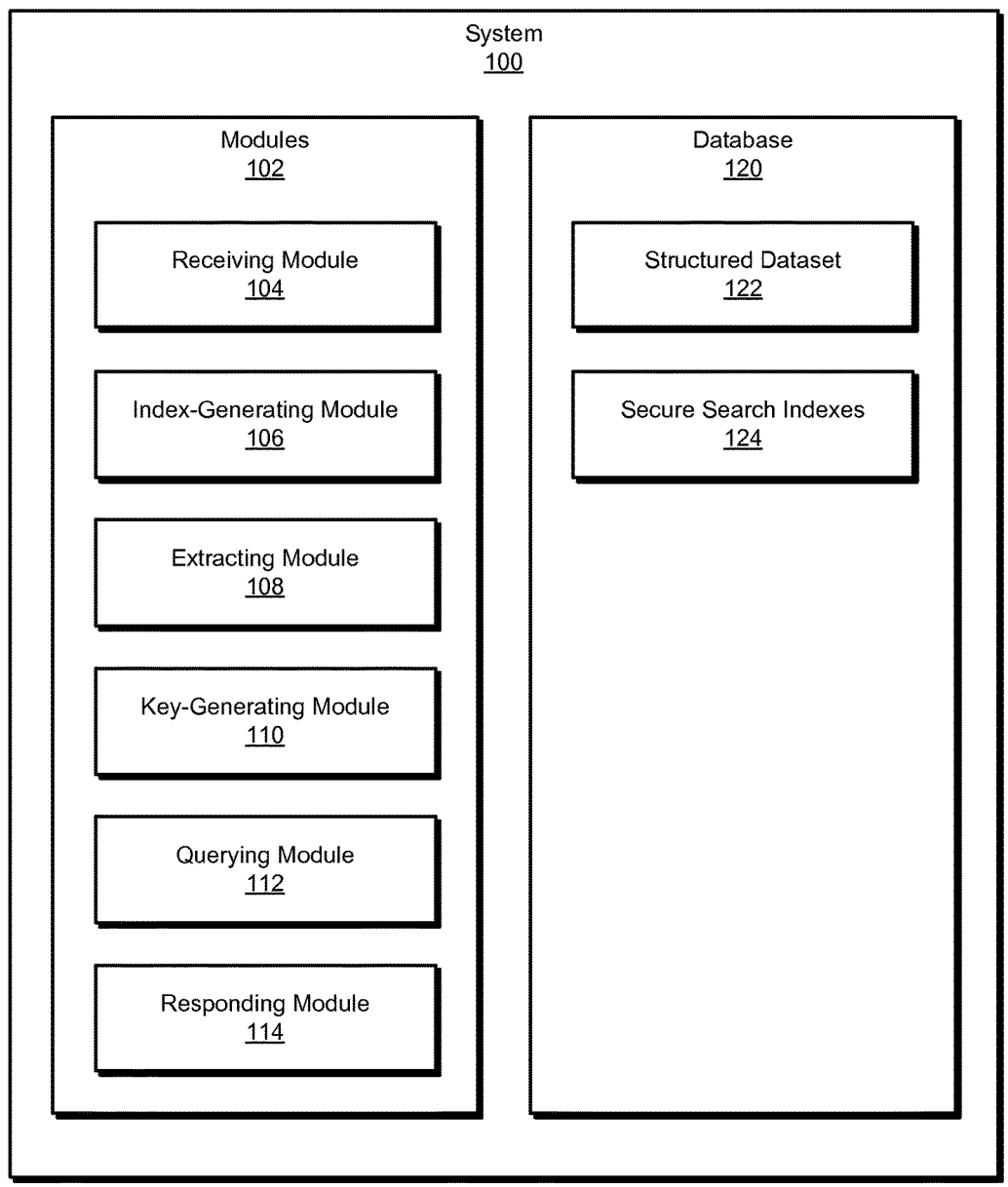
FIG. 1 is a block diagram of an exemplary system for searching unstructured documents for structured data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for searching unstructured documents for structured data. As will be explained in greater detail below, by using Bloom filters to implement secure search indexes for identifying sensitive structured data within unstructured documents, these systems and methods may reduce the memory footprint of the secure search indexes. Moreover, by generating secure search indexes whose keys are generated from values from two or more fields of a structured dataset containing sensitive data, the systems and methods described herein may improve the security of structured-data matching. Embodiments of the instant disclosure may also provide various other advantages and features, as discussed in greater detail below.

Figure 2:
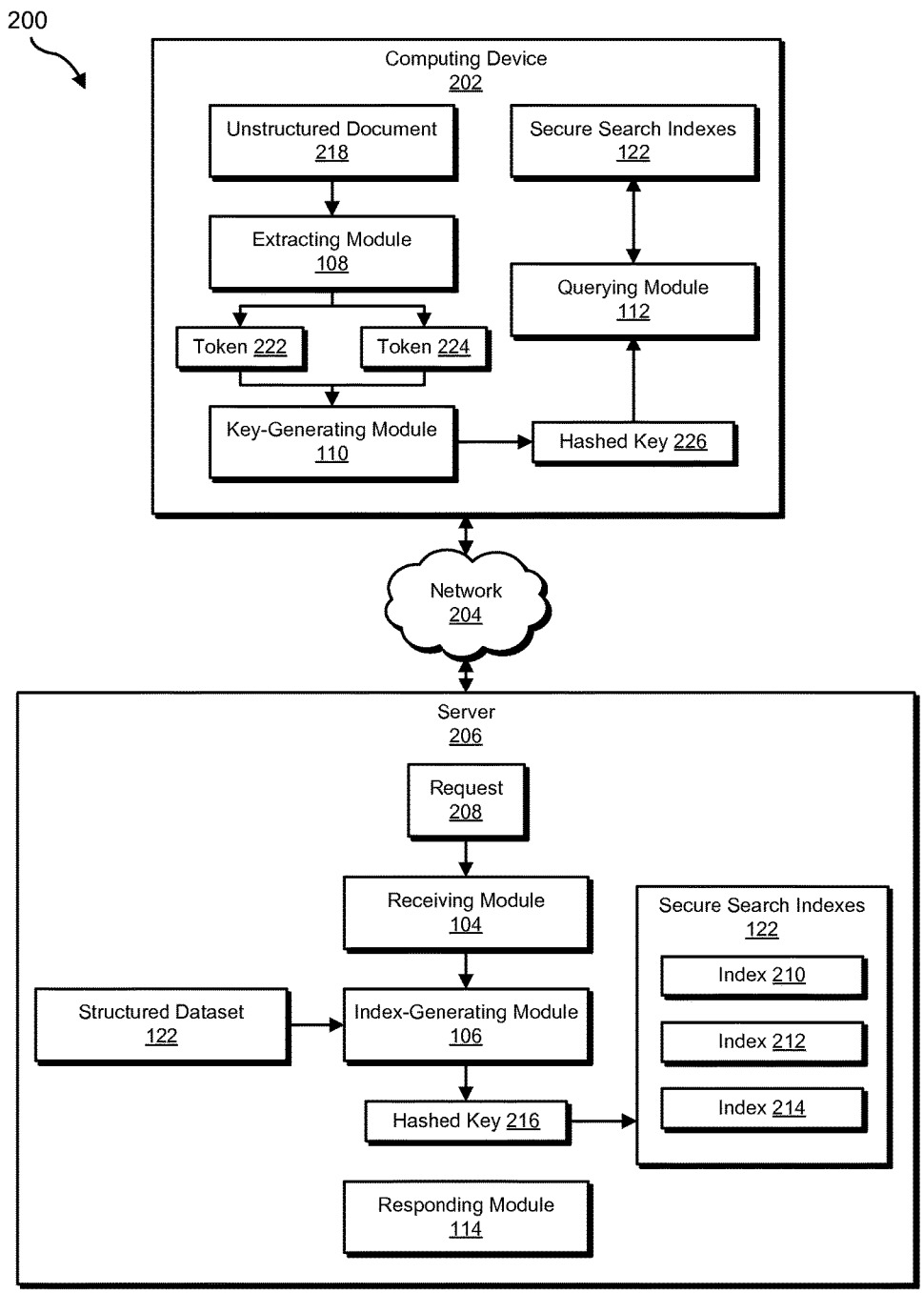
FIG. 2 is a block diagram of an additional exemplary system for searching unstructured documents for structured data.

The following will provide, with reference to FIGS. 1-2, detailed descriptions of exemplary systems for searching unstructured documents for structured data. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for searching unstructured documents for structured data. As illustrated in this figure, exemplary system 100 may include one or more modules 102 for performing one or more tasks. For example, and as will be explained in greater detail below, exemplary system 100 may include a receiving module 104 that receives a request to search unstructured documents for a document that contains (a) a value from a first field of a dataset and (b) a value from a second field of the dataset. Exemplary system 100 may also include an index-generating module 106 that generates a secure search index for searching the unstructured documents by, for each record in the dataset, (a) identifying, within the dataset, the record's value from the first field and the record's value from the second field, (b) generating a first hashed key from the record's value from the first field and the record's value from the second field, and (c) adding the first hashed key to the secure search index. Exemplary system 100 may further include an extracting module 108 that extracts a first token and a second token from an unstructured document.

In addition, and as will be described in greater detail below, exemplary system 100 may include a key-generating module 110 that generates a second hashed key from the first token and the second token. Exemplary system 100 may also include a querying module 112 that queries the secure search index to determine whether the second hashed key is contained in the secure search index. Exemplary system 100 may further include a responding module 114 that responds, upon determining that the second hashed key is contained in the secure search index, to the request with information about the unstructured document. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include a structured dataset 122 and/or secure search indexes 124 for storing secure search indexes. Database 120 may represent portions of a single database or computing device or a plurality of databases or computing devices. For example, database 120 may represent a portion of server 206 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as server 206 in FIG. 2, computing system 910 in FIG. 9, and/or portions of exemplary network architecture 1000 in FIG. 10.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to search unstructured documents for sensitive structured data. For example, and as will be described in greater detail below, one or more of modules 102 may cause computing device 202 and/or server 206 to (1) receive a request 208 to search unstructured documents within system 200 for a document that contains (a) a value from a first field of structured dataset 122 and (b) a value from a second field of structured dataset 122, (2) generate a secure search index 210 for searching the unstructured documents within system 200 by, for each record in structured dataset 122, (a) identifying, within structured dataset 122, the record's value from the first field and the record's value from the second field, (b) generating a hashed key (e.g., hashed key 216) from the record's value from the first field and the record's value from the second field, and (c) adding the hashed key to secure search index 210, (3) extract a token 222 and a token 224 from an unstructured document 218, (4) generate a hashed key 226 from token 222 and token 224, (5) query secure search index 210 to determine whether hashed key 226 is contained in secure search index 210, and (6) respond, upon determining that hashed key 226 is contained in secure search index 210, to request 208 with information about unstructured document 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing device 202 and server 206.

Figure 3:
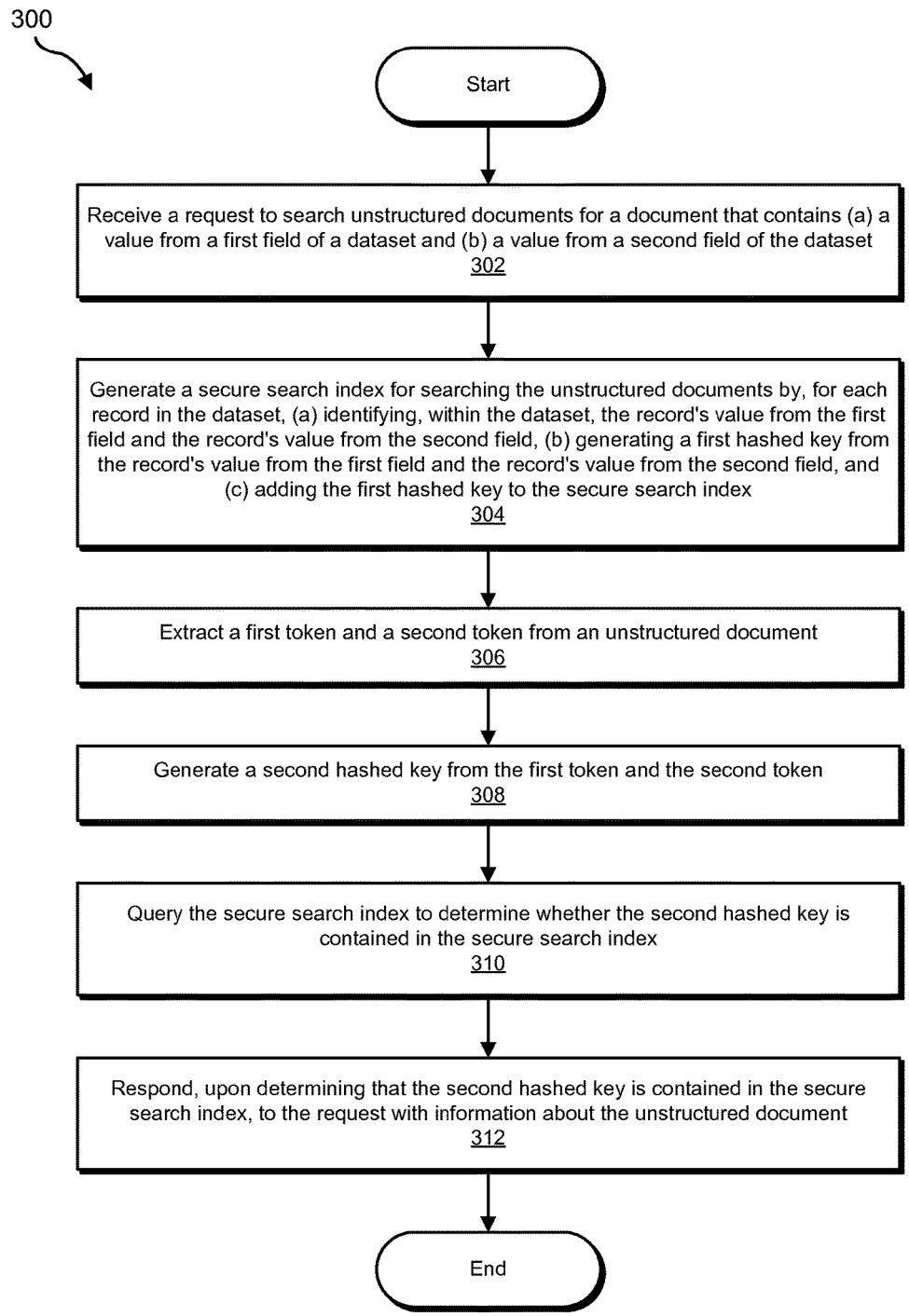
FIG. 3 is a flow diagram of an exemplary method for searching unstructured documents for structured data.
Figure 5:
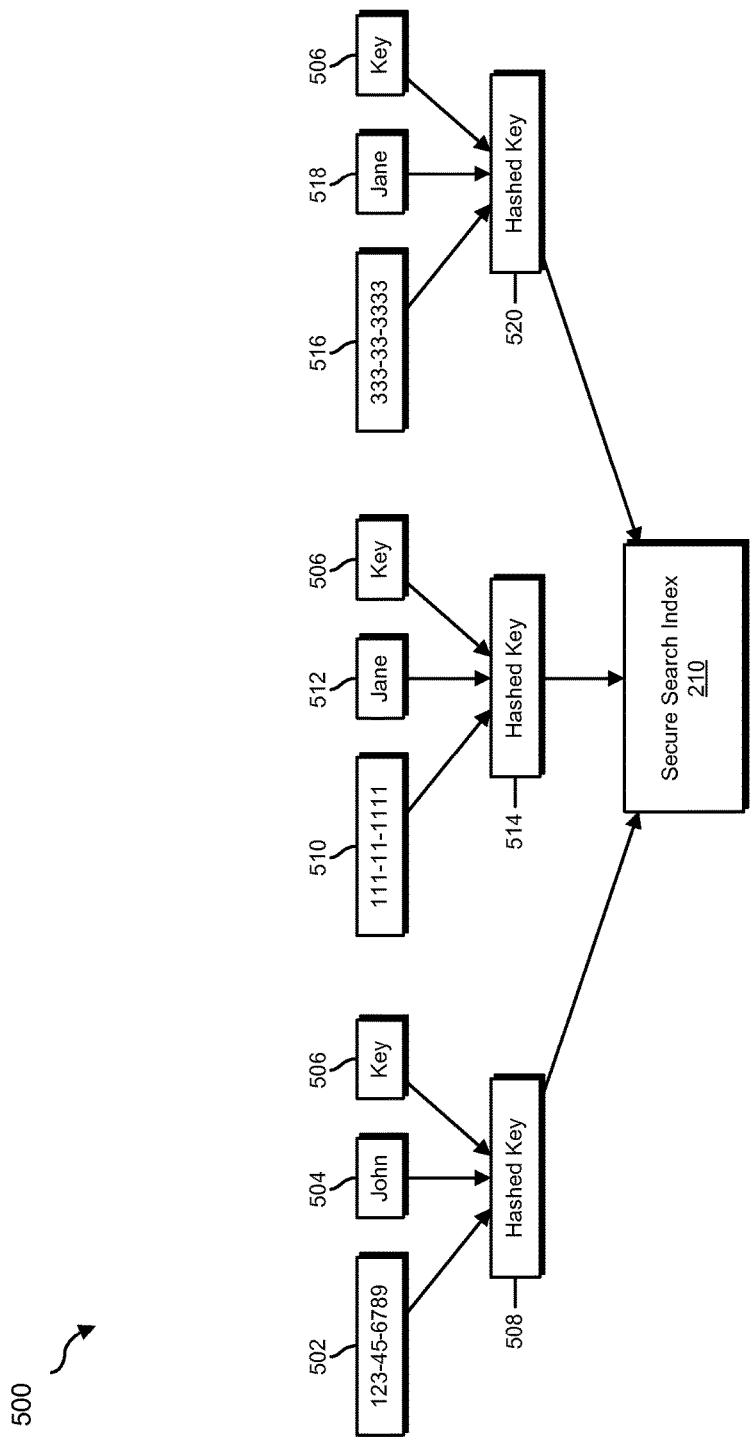
FIG. 5 is a flow diagram of an exemplary data flow for generating secure search indexes.

FIG. 3 is a flow diagram of an exemplary computer-implemented method 300 for searching unstructured documents for structured data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may receive a request to search unstructured documents for a document that contains (a) a value from a first field of a dataset and (b) a value from a second field of the dataset. For example, receiving module 104 may, as part of server 206 in FIG. 2, receive request 208 to search unstructured documents within system 200 for a document that contains (a) a value from field 402 of structured dataset 122 and (b) a value from field 406 of structured dataset 122.

Figure 8:
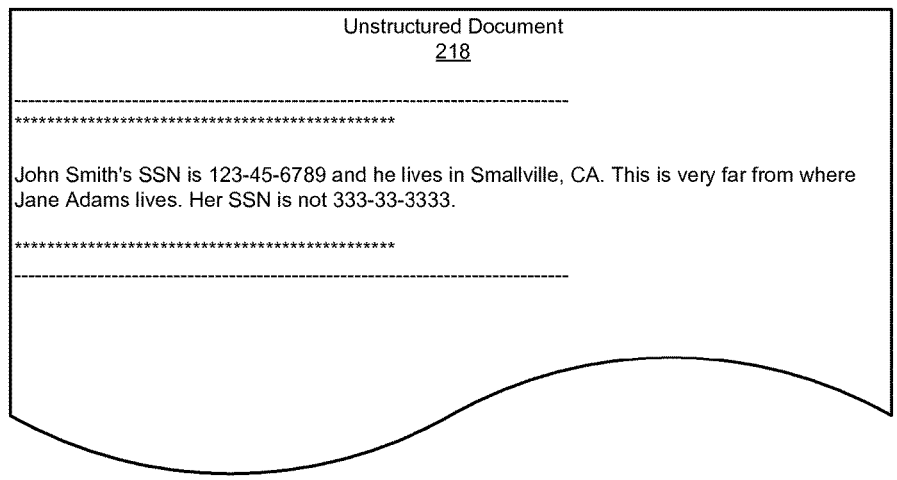
FIG. 8 is a block diagram of an exemplary unstructured document.

As used herein, the term "unstructured document" generally refers to any collection of unstructured text. Examples of unstructured documents include, without limitation, PDF documents, word-processing documents, text files, presentation documents, and electronic messages (such as emails). An exemplary unstructured document is illustrated in FIG. 8.

As used herein, the terms "dataset" and "structured dataset" generally refer to any collection of records whose data is stored to one or more fields. Examples of datasets and/or structured datasets include, without limitation, databases (e.g., relational databases or non-relational databases), spreadsheets, CSV (Comma Separated Values) files, and .XML (eXtensible Markup Language) files. Dataset may have any number of records and any number of fields. For example, some large datasets may have billions of records or more. The term "record," as used herein, generally refers to any set of data that specifies at least one value for at least one field of a dataset. In some examples, a record within a dataset or structured dataset may represent a data object and its attributes. Examples of records include, without limitation, rows or objects in databases, rows in spreadsheets, and/or objects in an .XML file. As used herein, the term "field" generally refers to any attribute of one or more records. Examples of fields include, without limitation, columns or keys in a database, columns in a spreadsheet, and attributes in an .XML file. In some examples, a field may contain a single type of data.

In some examples, values within a structured dataset may contain sensitive data. As used herein, the term "sensitive data" may refer to any combination of information that a user and/or company would not want sent outside of a computing device or system without knowledge and/or permission of the user and/or company. Examples of sensitive data may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), usage information, and/or any other type of sensitive data. In some examples, data may be considered sensitive if it is contained within the same context with other data. For example, an individual value of a field (e.g. a single social security number with no additional context) may not be considered sensitive unless it is contained in the same context with other values from related fields (e.g., a person's social security number, the person's first name, and the person's last name all in the same paragraph).

Values from some fields within a structured dataset may follow a known or easily recognizable pattern. For example, values from a field that stores social security numbers may follow a pattern of 9 digits formatted as NNN-NN-NNNN. Similarly, values from a field that stores ZIP codes may follow a pattern of 5 digits formatted as NNNNN or 9 digits formatted as NNNNN-NNNN. As will be explained in greater detail below, the systems described herein may identify candidate unstructured documents that may contain a value from a field whose values follow a known pattern by identifying unstructured documents that contain the known pattern. While values from some fields within a structured dataset may follow a known or easily recognizable pattern, values from other fields within the structured dataset may be free form and not follow a known or recognizable pattern. For example, values from fields that store first names, last names, cities, and/or states may not follow a known pattern.

FIG. 4 illustrates an exemplary structured dataset 122. As shown in FIG. 4, structured dataset 122 may include fields 402-412 and records 414-418 with values for each of fields 402-412. In this example, records 414-418 may represent three individuals, field 402 may contain social security numbers of the three individuals, field 404 may contain account numbers of the three individuals, field 406 may contain first names of the three individuals, field 408 may contain last names of the three individuals, field 410 may contain cities of the three individuals, and field 412 may include ZIP codes of the three individuals. In this example, values from fields 402, 404, and 412 may follow a known pattern, and values from fields 406-410 may not follow any known pattern.

Returning to FIG. 3, the systems described herein may perform step 302 in any suitable manner. In general, the systems described herein may enable a user to define matching criteria for identifying unstructured documents that contain sensitive data from structured datasets, and receiving module 104 may receive a request to search unstructured documents for a document that contains (a) a value from a first field of a dataset and (b) a value from a second field of the dataset by receiving such matching criteria.

In some examples, receiving module 104 may enable a user to define matching criteria for identifying unstructured documents that contain sensitive data from structured datasets by enabling the user to specify that a document that satisfies the matching criteria must have values from one or more combinations of fields of a single record within a structured dataset. Using FIG. 4 as an example, receiving module 104 may enable a user to specify that a document that satisfies specific matching criteria must have a record's value from field 402 or field 404 appearing in the document in the vicinity of at least two of the record's values from fields 406-412.

In some examples, receiving module 104 may require that at least one of the two or more fields in each combination of fields that is specified within matching criteria contains values that follow a known pattern. As will be explained in greater detail below, by requiring that at least one of the two or more fields in each combination contains values that follow a known pattern, the systems described herein may scan tokens extracted from unstructured documents for tokens that match the known pattern in order to identify candidate unstructured documents that may satisfy the matching criteria.

In some examples, receiving module 104 may enable a user to specify that the values from two or more fields within a combination must be located in the same vicinity within matching documents. For example, receiving module 104 may enable the user to specify that a value from a first field in the combination is required to be within a specified distance from a value from a second field in the combination. In some examples, vicinities and/or distances may be measured in tokens. For example, a vicinity of ten may indicate that the ten tokens preceding the matched token and/or the ten tokens following the matched token will be included in the vicinity of the matched token.

In some examples, receiving module 104 may enable a user to also specify normalization and/or validation rules for a particular field's values. In some examples, a normalization rule may specify a transformation of a field's values that is intended to remove any content that is not information bearing. Examples of such transformations include, without limitation, conversion to lower case, removal of delimiters, and removal of non-numeric characters. In some examples, a validation rule may define a rule for verifying that a value that matches a known pattern is also of an expected format and value. Examples of validation rules include, without limitation, checksums, removal of known test values for certain types of matches, and verification that a value is within a known range.

At step 304, one or more of the systems described herein may generate a secure search index for searching the unstructured documents by, for each record in the dataset, (a) identifying, within the dataset, the record's value from the first field and the record's value from the second field, (b) generating a first hashed key from the record's value from the first field and the record's value from the second field, and (c) adding the first hashed key to the secure search index. For example, index-generating module 106 may, as part of server 206 in FIG. 2, generate secure search index 210 for searching the unstructured documents within system 200 by, for each record in structured dataset 122, (a) identifying, within structured dataset 122, the record's value from field 402 and the record's value from field 406, (b) generating a hashed key (e.g., hashed keys 508, 514, and 520 in FIG. 5) from the record's value from field 402 and the record's value from field 406, and (c) adding the hashed key to secure search index 210.

As used herein, the term "secure search index" generally refers to any data structure (e.g., a Bloom filter or a hash table) that may be used to determine whether an object is or is not an element of a set of objects. In some examples, the term "secure search index" may refer to a space-efficient and/or probabilistic data structure that may be used to determine whether an object is likely or is likely not an element of a set of objects.

The systems described herein may perform step 304 in any suitable manner. As explained above, a user may specify that a document that meets specific matching criteria must have values from one or more combinations of fields of a single record within a structured dataset. In such examples, index-generating module 106 may generate a secure search index for each combination of fields specified within the matching criteria.

In some examples, index-generating module 106 may generate a secure search index for a specified combination of fields of a structured dataset that are required to satisfy matching criteria by (1) identifying, for each record within the structured dataset, the record's value for each field in the specified combination, (2) creating a hashed combination of the values (e.g., by concatenating the values and applying a hash function to the concatenated values), and (3) adding the hashed combination to the secure search index. Using FIGS. 4 and 5 as an example, index-generating module 106 may generate secure search index 210 for fields 402 and 406 of structured dataset 122 by identifying, for each of records 414-418 within structured dataset 122, the record's value for field 402 (e.g., values 502, 510, and 516 in FIG. 5) and the record's value for field 406 (e.g., values 504, 512, and 518 in FIG. 5), (2) creating a hashed combination of the values (e.g., hashed keys 508 from a combination of values 502 and 504, hashed key 514 from a combination of values 510 and 512, and hashed key 520 from a combination of values 516 and 518), and (3) adding the hashed combination to secure search index 210.

Figure 6:
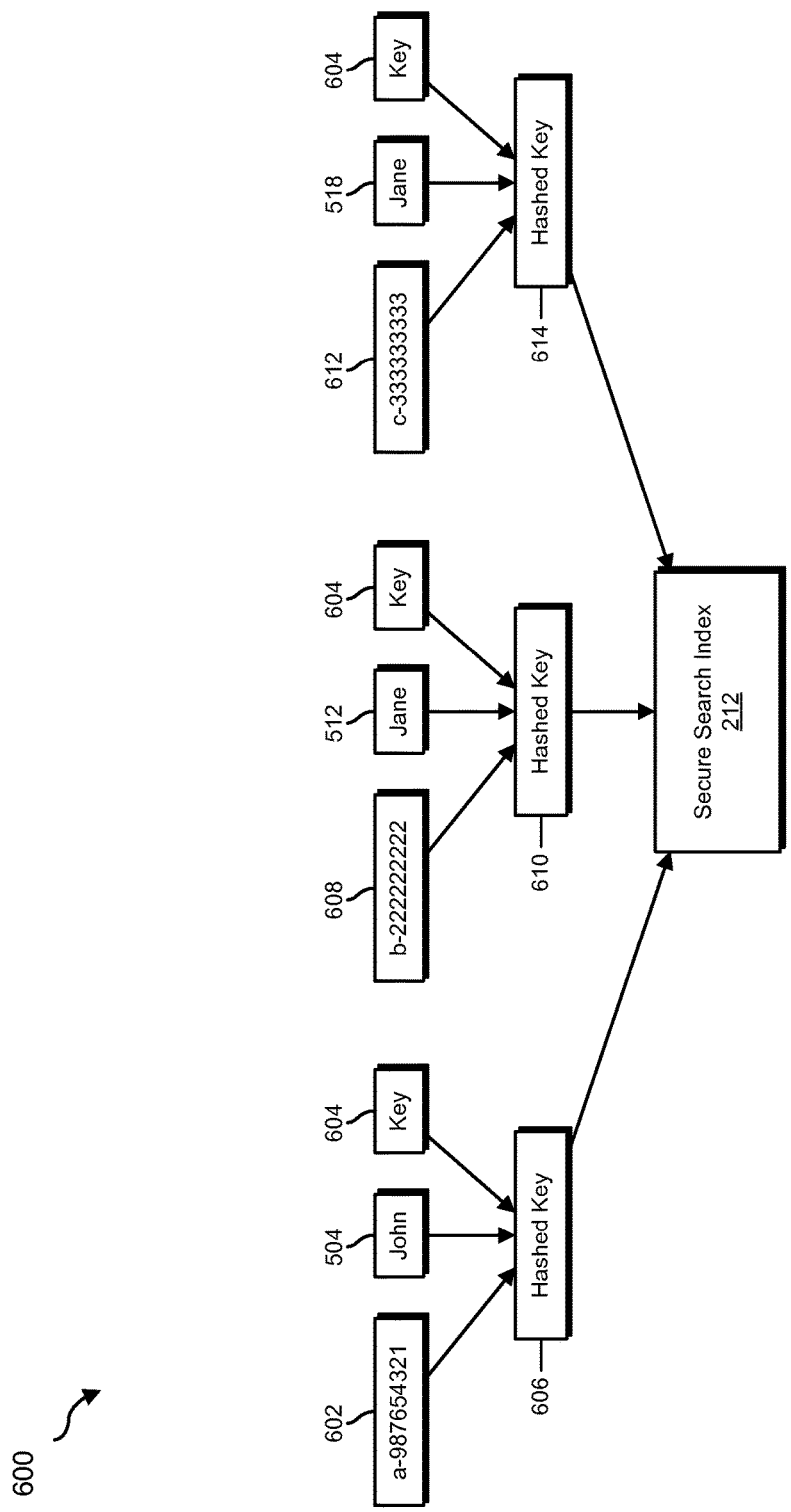
FIG. 6 is a flow diagram of an additional exemplary data flow for generating secure search indexes.

Using FIG. 6 as another example, index-generating module 106 may generate secure search index 212 for fields 404 and 406 of structured dataset 122 by identifying, for each of records 414-418 within structured dataset 122, the record's value for field 404 (e.g., values 602, 608, and 612 in FIG. 6) and the record's value for field 406 (e.g., values 504, 512, and 518 in FIG. 5), (2) creating a hashed combination of the values (e.g., hashed keys 606 from a combination of values 602 and 504, hashed key 610 from a combination of values 608 and 512, and hashed key 614 from a combination of values 612 and 518), and (3) adding the hashed combination to secure search index 212.

Figure 7:
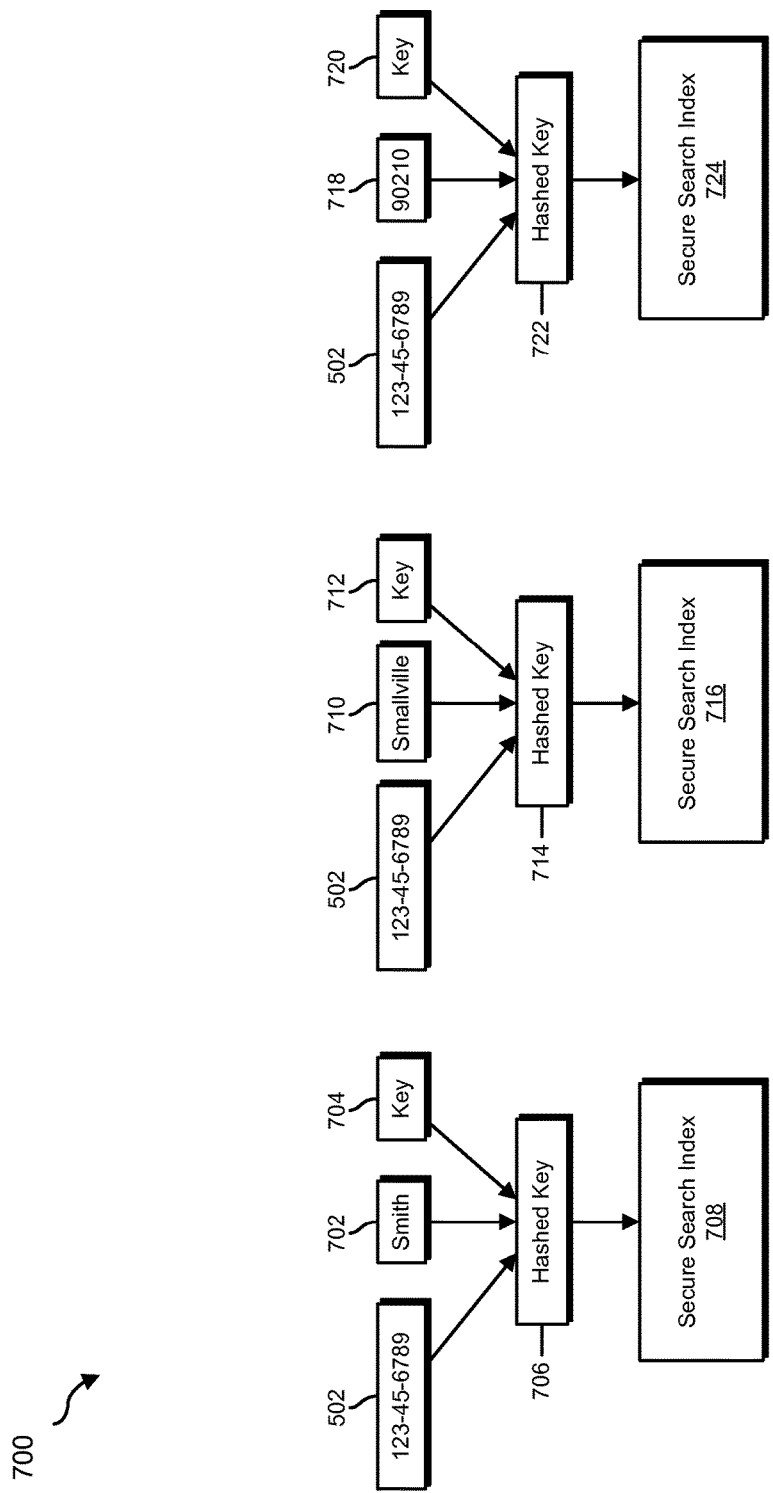
FIG. 7 is a flow diagram of an additional exemplary data flow for generating secure search indexes.

Using FIG. 7 as another example, index-generating module 106 may generate secure search index 706 for fields 402 and 408 of structured dataset 122 by identifying, for each of records 414-418 within structured dataset 122, the record's value for field 402 (e.g., value 502) and the record's value for field 408 (e.g., value 702), (2) creating a hashed combination of the values (e.g., hashed key 706 from a combination of values 502 and 702), and (3) adding the hashed combination to secure search index 708. Likewise, index-generating module 106 may generate secure search index 716 for fields 402 and 410 of structured dataset 122 by identifying, for each of records 414-418 within structured dataset 122, the record's value for field 402 (e.g., value 502) and the record's value for field 410 (e.g., value 710), (2) creating a hashed combination of the values (e.g., hashed key 714 from a combination of values 502 and 710), and (3) adding the hashed combination to secure search index 716. Similarly, index-generating module 106 may generate secure search index 724 for fields 402 and 412 of structured dataset 122 by identifying, for each of records 414-418 within structured dataset 122, the record's value for field 402 (e.g., value 502) and the record's value for field 412 (e.g., value 718), (2) creating a hashed combination of the values (e.g., hashed key 722 from a combination of values 502 and 718), and (3) adding the hashed combination to secure search index 724.

In some examples, index-generating module 106 may create a hashed combination of the values of two or more fields by cryptographically hashing an intermediate combination of the values. In some examples, index-generating module 106 may improve the security of sensitive data within a secure search index by including a cryptographic key (e.g., a cryptographic salt) in the combination of values. In some examples, index-generating module 106 may combine the values and key by simply concatenating their string representations, possibly with a delimiter between them, or may combine the values and key in a more elaborate manner (e.g., using multiple copies of the key, splitting the values, etc.). Using values 502 and 504 in FIG. 5 from record 414 in FIG. 4 as an example, index-generating module 106 may combine the social security number "123-45-6789" from field 402, the first name "John" from field 406, and key 506 (e.g., the string "55555555") to generate the combined string "123456789 john 155555555." Index-generating module 106 may then hash the combined string to produce a hashed key that may be added to secure search index 210.

At step 306, one or more of the systems described herein may extract a first token and a second token from an unstructured document. For example, extracting module 108 may, as part of computing device 202 in FIG. 2, extract token 222 and token 224 from unstructured document 218.

The term, "token," as used herein, generally refers to a portion of text that provides its own meaning beyond the letters or substrings that compose it. Tokens may be frequently atomic or indivisible, and relatively short in length. By analogy, the words in an English language dictionary may be generally atomic or indivisible, although some words may be compound words. Examples of tokens include, without limitation, words, phrases, symbols, or any other meaningful element of text. In some examples and some languages, tokens may be typically separated from each other by delimiters. In other examples and other languages (e.g., Japanese or Chinese), an individual character may be treated as a token. The term, "delimiter," as used herein, generally refers to a text element that designates a meaningful separation between tokens. Examples of delimiters may include spaces, line breaks, other whitespace characters, colons, periods, underscores, hyphens, and/or any other suitable punctuation.

The systems described herein may perform step 306 in any suitable manner. As described above, in some examples, the systems disclosed herein may require that each combination of fields within matching criteria include at least one field whose values follow a known pattern. In these examples, extracting module 108 may identify candidate unstructured documents that may satisfy the matching criteria by identifying unstructured documents that contain a token that matches the known pattern. In some examples, extracting module 108 may identify candidate unstructured documents that may satisfy the matching criteria using a regular expression based on the known pattern. Once a candidate unstructured document is found, extracting module 108 may extract other tokens from the document. If the matching criteria specifies a vicinity, extracting module 108 may extract only those tokens within the specified vicinity of the matching token.

Using FIG. 8 as an example, extracting module 108 may determine that unstructured document 218 is a candidate for satisfying matching criteria that require a social security number by extracting the tokens "123-45-6789" and "333-33-3333" from unstructured document 218 and determining that these tokens match a known pattern of social security numbers. In the event that the matching criteria indicates that values from another field must be found within a vicinity of 10 of any social security number, extracting module 108 may identify two candidate vicinities within unstructured document 218 (e.g., the first vicinity starting at the beginning of the text and ending with the word "far" and the second vicinity beginning with the word "far" and ending at the end of the text). In this example, extracting module 108 may extract tokens from each vicinity. As will be explained below, each token from the first vicinity may be combined with the token "123-45-6789," and each token from the second vicinity may be combined with the token "333-33-3333" to determine whether unstructured document 218 satisfies the matching criteria.

At step 308, one or more of the systems described herein may generate a second hashed key from the first token and the second token. For example, key-generating module 110 may, as part of computing device 202 in FIG. 2, generate hashed key 226 from token 222 and token 224.

The systems described herein may perform step 308 in any suitable manner. In general, key-generating module 110 may generate hashed keys from every combination of tokens that may satisfy a particular matching criteria. For example if specific matching criteria requires (a) a value from a first field of a dataset and (b) a value from a second field of the dataset, key-generating module 110 may generate hashed keys from every combination of two tokens extracted from an unstructured document. Additionally or alternatively, if specific matching criteria requires (a) a value from a first field of a dataset to be within a certain vicinity of (b) a value from a second field of the dataset, key-generating module 110 may generate hashed keys from every combination of two tokens extracted from the proper vicinities of an unstructured document. In general, key-generating module 110 may generate hashed keys from a combination of tokens using the same method that was used in step 304 to generate hashed keys.

Using FIG. 8 as an example, key-generating module 110 may generate hashed keys from unstructured document 218 by separately combining each token in the vicinity of the token "123-45-6789" with the token "123-45-6789." Similarly, key-generating module 110 may generate additional hashed keys from unstructured document 218 by separately combining each token in the vicinity of the token "333-33-3333" with the token "333-33-3333."

At step 310, one or more of the systems described herein may query the secure search index to determine whether the second hashed key is contained in the secure search index. For example, querying module 112 may, as part of computing device 202 in FIG. 2, query secure search index 210 to determine whether hashed key 226 is contained in secure search index 210.

The systems described herein may perform step 310 in any suitable manner. In general, querying module 112 may query the secure search indexes that have been generated for each combination of fields specified within matching criteria with the hashed keys from step 308 to determine whether the unstructured document from which the hashed keys were generated satisfies the matching criteria. Using FIG. 8 as an example, querying module 112 may query secure search indexes 210, 708, 716, and 724 with each hashed key that was generated as part of step 308. In this example, querying module 112 may determine that (1) the hashed key generated from the token "123-45-6789" and the token "john" is contained in secure search index 210, (2) the hashed key generated from the token "123-45-6789" and the token "smith" is contained in secure search index 708, and (3) the hashed key generated from the token "123-45-6789" and the token "smallville" is contained in secure search index 716. Additionally, querying module 112 may determine that the hashed key generated from the token "333-33-3333" and the token "Jane" is contained in secure search index 210. In this example, the hashed key generated from the token "333-33-3333" and the token "Adams" is not contained in secure search index 708.

At step 312, one or more of the systems described herein may respond, upon determining that the second hashed key is contained in the secure search index, to the request with information about the unstructured document. For example, responding module 114 may, as part of server 206 in FIG. 2, respond, upon determining that hashed key 226 is contained in secure search index 210, to request 208 with information about unstructured document 218.

The systems described herein may perform step 312 in any suitable manner. In one example, to respond to a request for unstructured documents that satisfy matching criteria, responding module 114 may identify an unstructured document that satisfies the matching criteria by determining that the hashed keys extracted from the unstructured document at step 308 are contained within the secure search indexes that were generated for each required combination of fields specified within the matching criteria. Using FIG. 8 as an example, responding module 114 may determine that unstructured document 218 satisfies matching criteria that requires the social security number of a record to be within the same vicinity of at least two of the first name, the last name, or the city of the record by determining that (1) the hashed key generated from the token "123-45-6789" and the token "john" is contained in secure search index 210, (2) the hashed key generated from the token "123-45-6789" and the token "smith" is contained in secure search index 708, and (3) the hashed key generated from the token "123-45-6789" and the token "smallville" is contained in secure search index 716.

The systems described herein may respond to requests in any suitable manner. For example, responding module 114 may respond to a request for unstructured documents that contain sensitive data and/or that satisfy matching criteria by providing the unstructured documents themselves and/or identifiers (e.g., file names) of the unstructured documents. Additionally or alternatively, responding module 114 may respond to a request for unstructured documents that contain sensitive data and/or that satisfy matching criteria by returning the locations and lengths of the matching tokens within the unstructured documents, the number of times the matching tokens satisfied matching criteria, and/or the records within a dataset that satisfy the matching criteria. In some examples, the same token can satisfy matching criteria for several records in a dataset. For example, if there are two John Smiths in a dataset and both of their social security numbers appear within the same vicinity as the name "John Smith" then there may be four matching tokens (e.g., "john," "smith," and the tokens that include the two social security numbers), there may be two matching records, and the tokens "john" and "smith" may be part of both record matches.

In at least one example, responding module 114 may validate matches against a centralized database that contains higher accuracy data. By validating matches against such a central database, responding module 114 may reduce the number of false-positive matches. Upon completion of step 312, exemplary method 300 in FIG. 3 may terminate.

As explained above, by using Bloom filters to implement secure search indexes for identifying sensitive structured data within unstructured documents, these systems and methods may reduce the memory footprint of the secure search indexes. Moreover, by generating secure search indexes whose keys are generated from values from two or more fields of a structured dataset containing sensitive data, the systems and methods described herein may improve the security of structured-data matching and/or further reduce the memory footprint of the secure search indexes since some fields may not be represented directly or individually in a secure search index.

Figure 9:
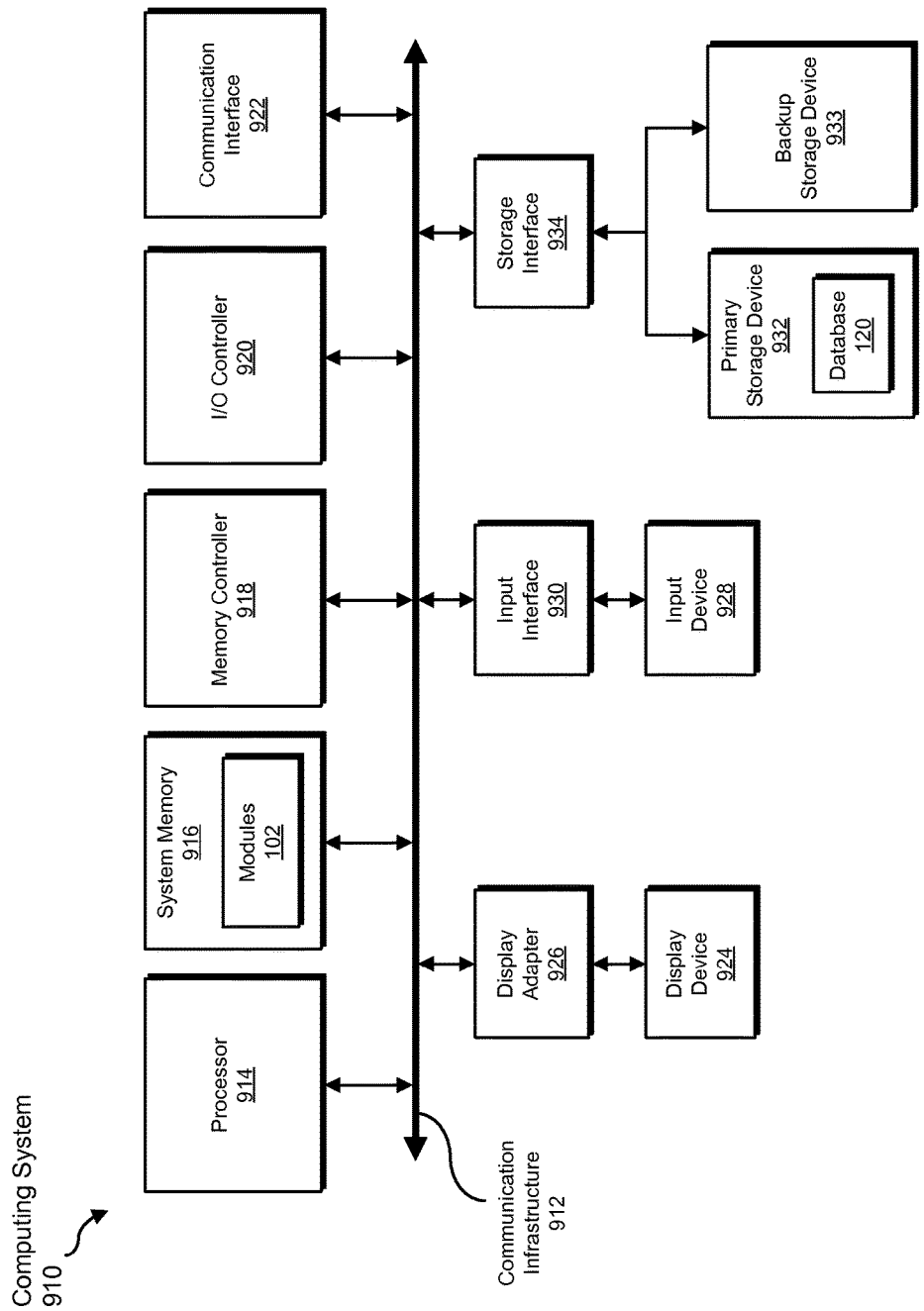
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
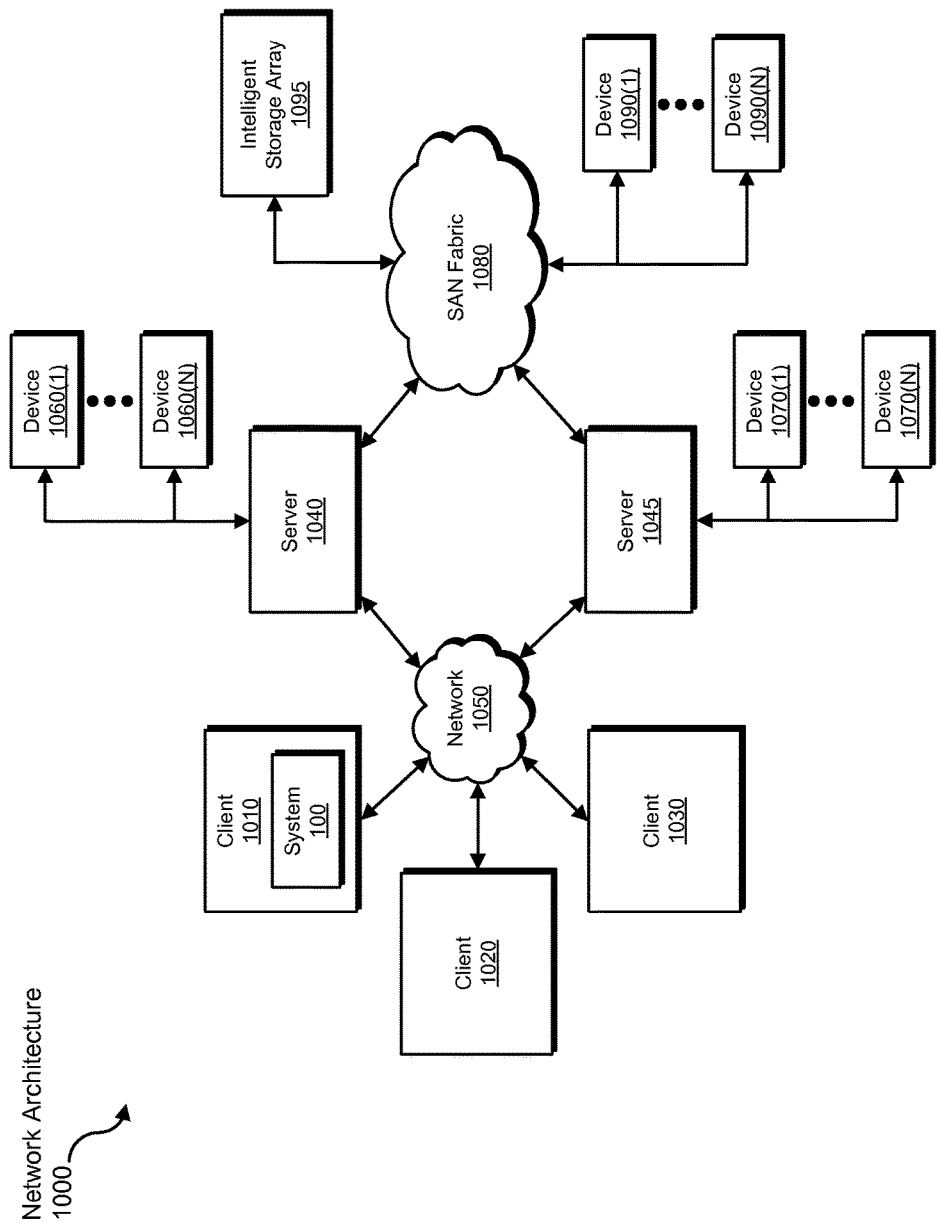
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for searching unstructured documents for structured data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a dataset that includes sensitive data to be transformed, transform the dataset into a Bloom filter for identifying the sensitive data in unstructured documents, output the Bloom filter to a computing system that includes unstructured documents, use the Bloom filter to identify at least one unstructured document that includes the sensitive data, and store the Bloom filter to the computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for searching unstructured documents for structured data, at least a portion of the method being performed by a computing device comprising at least one processor, the method comprising:
receiving a request to search unstructured documents for a document that contains:
a value from a first field of a dataset; and
a value from a second field of the dataset;
generating a secure search index for searching the unstructured documents by, for each record in the dataset:
identifying, within the dataset, the record's value from the first field and the record's value from the second field;
generating a first hashed key from the record's value from the first field and the record's value from the second field;
adding the first hashed key to the secure search index;
extracting a first token and a second token from an unstructured document;
generating a second hashed key from the first token and the second token;
querying the secure search index to determine whether the second hashed key is contained in the secure search index;
responding, upon determining that the second hashed key is contained in the secure search index, to the request with information about the unstructured document.

2. The computer-implemented method of claim 1, wherein:
values from the first field follow a known pattern;
the request for the document specifies that the value from the first field is required to be within a specified distance from the value from the second field;
extracting the first token and the second token from the unstructured document comprises:
using the known pattern to identify the first token within the unstructured document;
identifying the second token within the specified distance from the first token.

3. The computer-implemented method of claim 1, wherein:
receiving the request to search unstructured documents for the document comprises receiving a request to search unstructured documents for a document that contains:
the value from the first field of the dataset;
the value from the second field of the dataset; and
a value from a third field of the dataset, wherein:
values from the first field follow a known pattern;
values from the second field and values from the third field do not follow a known pattern;
the computer-implemented method further comprises:
generating an additional secure search index by, for each record in the dataset:
identifying, within the dataset, the record's value from the first field and the record's value from the third field;
generating a third hashed key from the record's value from the first field and the record's value from the third field;
adding the third hashed key to the additional secure search index;
extracting a third token from the unstructured document;
generating a fourth hashed key from the first token and the third token;
querying the additional secure search index to determine whether the fourth hashed key is contained in the additional secure search index;
responding to the request with information about the unstructured document occurs upon determining that the fourth hashed key is contained in the additional secure search index.

4. The computer-implemented method of claim 1, wherein:
receiving the request to search unstructured documents for the document comprises receiving a request to search unstructured documents for a document that contains:
the value from the first field of the dataset;
the value from the second field of the dataset; and
a value from a third field of the dataset, wherein:
values from the first field follow a first known pattern;
values from the third field follow a second known pattern;
values from the second field do not follow a known pattern;
the computer-implemented method further comprises:
generating an additional secure search index by, for each record in the dataset:
identifying, within the dataset, the record's value from the second field and the record's value from the third field;
generating a third hashed key from the record's value from the second field and the record's value from the third field;
adding the third hashed key to the additional secure search index;
extracting a third token from the unstructured document;
generating a fourth hashed key from the second token and the third token;
querying the additional secure search index to determine whether the fourth hashed key is contained in the additional secure search index;
responding to the request with information about the unstructured document occurs upon determining that the fourth hashed key is contained in the additional secure search index.

5. The computer-implemented method of claim 1, wherein:
the first hashed key is generated from the record's value from the first field, the record's value from the second field, and a cryptographic key;
the second hashed key is generated from the first token, the second token, and the cryptographic key.

6. The computer-implemented method of claim 1, wherein the secure search index comprises a Bloom filter.

7. The computer-implemented method of claim 1, wherein generating the first hashed key comprises:
generating an intermediate value from a combination of the record's value from the first field and the record's value from the second field;
hashing the intermediate value to produce the hashed key.

8. The computer-implemented method of claim 1, wherein:
the step of generating the secure search index for searching the unstructured documents is performed at a server-side computing device;

the steps of extracting the first token and the second token, generating the second hashed key, and querying the secure search index are performed at a client-side computing device to which the secure search index has been distributed.

9. The computer-implemented method of claim 1, wherein:
values from the first field follow a known pattern;
extracting the first token from the unstructured document comprises using a regular expression based on the known pattern to identify the first token within the unstructured document.

10. The computer-implemented method of claim 1, wherein:
at least the first field of the dataset comprises sensitive data;
the first field of the dataset comprises at least one of:
social security numbers;
account numbers;
credit card numbers.

11. A system for searching unstructured documents for structured data, the system comprising:
a receiving module, stored in memory, that receives a request to search unstructured documents for a document that contains:
a value from a first field of a dataset; and
a value from a second field of the dataset;
an index-generating module, stored in memory, that generates a secure search index for searching the unstructured documents by, for each record in the dataset:
identifying, within the dataset, the record's value from the first field and the record's value from the second field;
generating a first hashed key from the record's value from the first field and the record's value from the second field;
adding the first hashed key to the secure search index;
an extracting module, stored in memory, that extracts a first token and a second token from an unstructured document;
a key-generating module, stored in memory, that generates a second hashed key from the first token and the second token;
a querying module, stored in memory, that queries the secure search index to determine whether the second hashed key is contained in the secure search index;
a responding module, stored in memory, that responds, upon determining that the second hashed key is contained in the secure search index, to the request with information about the unstructured document;
at least one physical processor configured to execute the receiving module, the index-generating module, the extracting module, the key-generating module, the querying module, and the responding module.

12. The system of claim 11, wherein:
values from the first field follow a known pattern;
the request for the document specifies that the value from the first field is required to be within a specified distance from the value from the second field;
the extracting module extracts the first token and the second token from the unstructured document by:
using the known pattern to identify the first token within the unstructured document;
identifying the second token within the specified distance from the first token.

13. The system of claim 11, wherein:
the receiving module receives the request to search unstructured documents for the document by receiving a request to search unstructured documents for a document that contains:
the value from the first field of the dataset;
the value from the second field of the dataset; and
a value from a third field of the dataset, wherein:
values from the first field follow a known pattern;
values from the second field and values from the third field do not follow a known pattern;
the index-generating module further generates an additional secure search index by, for each record in the dataset:
identifying, within the dataset, the record's value from the first field and the record's value from the third field;
generating a third hashed key from the record's value from the first field and the record's value from the third field;
adding the third hashed key to the additional secure search index;
the extracting module further extracts a third token from the unstructured document;
the key-generating module further generates a fourth hashed key from the first token and the third token;
the querying module further queries the additional secure search index to determine whether the fourth hashed key is contained in the additional secure search index;
the responding module responds to the request with information about the unstructured document upon determining that the fourth hashed key is contained in the additional secure search index.

14. The system of claim 11, wherein:
the receiving module receives the request to search unstructured documents for the document comprises receiving a request to search unstructured documents for a document that contains:
the value from the first field of the dataset;
the value from the second field of the dataset; and
a value from a third field of the dataset, wherein:
values from the first field follow a first known pattern;
values from the third field follow a second known pattern;
values from the second field do not follow a known pattern;
the index-generating module further generates an additional secure search index by, for each record in the dataset:
identifying, within the dataset, the record's value from the second field and the record's value from the third field;
generating a third hashed key from the record's value from the second field and the record's value from the third field;
adding the third hashed key to the additional secure search index;
the extracting module further extracts a third token from the unstructured document;
the key-generating module further generates a fourth hashed key from the second token and the third token;
the querying module further queries the additional secure search index to determine whether the fourth hashed key is contained in the additional secure search index;
the responding module responds to the request with information about the unstructured document upon determining that the fourth hashed key is contained in the additional secure search index.

15. The system of claim 11, wherein:
the first hashed key is generated from the record's value from the first field, the record's value from the second field, and a cryptographic key;
the second hashed key is generated from the first token, the second token, and the cryptographic key.

16. The system of claim 11, wherein the secure search index comprises a Bloom filter.

17. The system of claim 11, wherein the index-generating module generates the first hashed key by:
generating an intermediate value from a combination of the record's value from the first field and the record's value from the second field;
hashing the intermediate value to produce the hashed key.

18. The system of claim 11, wherein:
a server-side computing device comprises the index-generating module;
a client-side computing device to which the secure search index has been distributed comprises the extracting module, the key-generating module, and the querying module.

19. The system of claim 11, wherein:
values from the first field follow a known pattern;
the extracting module extracts the first token from the unstructured document by using a regular expression based on the known pattern to identify the first token within the unstructured document.

20. A non-transitory computer-readable medium comprising one or more computer-readable instructions that, when executed by at least one processor of a computing device, cause the computing device to:
receive a request to search unstructured documents for a document that contains:
a value from a first field of a dataset; and
a value from a second field of the dataset;
generate a secure search index for searching the unstructured documents by, for each record in the dataset:
identifying, within the dataset, the record's value from the first field and the record's value from the second field;
generating a first hashed key from the record's value from the first field and the record's value from the second field;
adding the first hashed key to the secure search index;
extract a first token and a second token from an unstructured document;
generate a second hashed key from the first token and the second token;
query the secure search index to determine whether the second hashed key is contained in the secure search index;
respond, upon determining that the second hashed key is contained in the secure search index, to the request with information about the unstructured document.

* * * * *